(12) United States Patent
Cline (10) Patent No.: US 11,852,435 B2
(45) Date of Patent: Dec. 26, 2023

(54) METHODS, SYSTEMS, AND COMPUTER PROGRAM PRODUCTS FOR DETERMINING AN AMMUNITION ROUND COUNT BY RESISTIVE ENCODING

(71) Applicant: 2A Tactical LLC, Durham, NC (US)

(72) Inventor: Zachary Cline, Wake Forest, NC (US)

(73) Assignee: 2A Tactical LLC, Durham, NC (US)

( * ) Notice: Subject to any disclaimer, the term of this patent is extended or adjusted under 35 U.S.C. 154(b) by 0 days.

(21) Appl. No.: 17/722,105

(22) Filed: Apr. 15, 2022

(65) Prior Publication Data
US 2023/0332853 A1 Oct. 19, 2023

(51) Int. Cl.
*F41A 9/62* (2006.01)
*G01D 5/165* (2006.01)

(52) U.S. Cl.
CPC ............... *F41A 9/62* (2013.01); *G01D 5/165* (2013.01)

(58) Field of Classification Search
CPC .................................. F41A 9/62; G01D 5/165
USPC ......................................................... 42/1.02
See application file for complete search history.

(56) References Cited

U.S. PATENT DOCUMENTS

| | | | |
|---|---|---|---|
| 5,826,360 A * | 10/1998 | Herold | F41A 9/62 42/1.02 |
| 10,900,726 B2 | 1/2021 | Masarik et al. | |
| 2011/0126622 A1 * | 6/2011 | Turner | F41A 19/01 73/514.01 |
| 2016/0069629 A1 * | 3/2016 | Seckman | F41A 9/62 42/1.01 |
| 2017/0336160 A1 * | 11/2017 | Walther | F41A 9/62 |
| 2018/0172377 A1 * | 6/2018 | Keys | F41A 9/62 |

(Continued)

*Primary Examiner* — Bret Hayes
(74) *Attorney, Agent, or Firm* — NK Patent Law (57) ABSTRACT

The subject matter described herein includes methods, systems, and computer program products for determining an ammunition round count by resistive encoding. According to one embodiment, a system for providing an indication of a number of rounds of ammunition in a magazine of a firearm includes a follower for the rounds to rest upon, where the follower is internal to the magazine and pushes the follower and the rounds toward a mouth of the magazine to facilitate feeding the rounds into the firearm. The system also includes a resistive strip membrane potentiometer sensor arranged substantially along a length of the magazine that generates an output voltage when a first and a second circuit are connected by applying pressure to a surface of the sensor. The output voltage varies based on a position where the pressure is applied to the surface of the sensor and the first and second circuits are connected. A power source, such as a battery or AC/DC adapter, applies power to the system which contains a constant current source to generate and provide an input voltage to the resistive strip membrane potentiometer sensor. A wiper applies pressure to the surface of the sensor and connects the first and second circuits. The wiper is a non-conductive mechanism attached to the follower and configured to move along the length of the magazine corresponding to the resistive strip membrane potentiometer sensor. A round counter converts the output voltage generated by the resistive strip membrane potentiometer sensor into an indication of the number of rounds of ammunition in the firearm magazine ("round count data").

20 Claims, 7 Drawing Sheets

(56) References Cited

U.S. PATENT DOCUMENTS

| | | | |
|---|---|---|---|
| 2018/0196628 A1* | 7/2018 | Samo | F41A 9/62 |
| 2018/0299217 A1* | 10/2018 | Hedeen | F41C 23/10 |
| 2019/0277590 A1* | 9/2019 | Masarik | F41A 9/70 |
| 2020/0080807 A1* | 3/2020 | Flood | F41A 9/62 |
| 2021/0215446 A1* | 7/2021 | Czarnecki | F41A 9/62 |

* cited by examiner

METHODS, SYSTEMS, AND COMPUTER PROGRAM PRODUCTS FOR DETERMINING AN AMMUNITION ROUND COUNT BY RESISTIVE ENCODING

BACKGROUND

Field of the Invention

The present invention relates to counting a number of rounds, bullets, cartridges, or other ammunition in a firearm magazine, and more specifically, to methods, systems, and computer program products for determining an ammunition round count by resistive encoding.

Description of Related Art

Round counting systems in firearms have presented many challenges to the industry. Most conventional round counting systems use Hall effect sensors, with accompanying magnets in the follower, to obtain round count data by detecting changes in the distance between the magnet and the sensors. Hall effect-based systems use an applied magnetic field to induce an "on" or "off" state in each of a plurality of switches or sensors. A magnet embedded into the follower of the magazine activates the switches as the follower travels through the magazine. A round count is determined by analyzing which switch is activated and correlating that information to a position of the follower inside the magazine.

Other conventional round counting systems use Reed switches as an alternative to Hall effect encoding. Like Hall effect switch/sensor-based round counting systems, Reed switch-based round counting systems use an applied magnetic field to induce operation and the system determines the position of the follower by determining which Reed switch is activated due to the magnetic field of the magnet imbedded in the follower.

Yet other conventional round counting systems use capacitive strip encoders to obtain round count data. Capacitive strip encoder systems measure a change in capacitance using a high frequency reference signal. Such systems determine a round count by analyzing the change in capacitance as the follower moves through the magazine. One problem, however, with using high frequency systems like this is that they are expensive and difficult to tune correctly.

There are also problems associated with Hall effect sensors. For example, one problem is that the magnetic field is greatly reduced before reaching the sensors. In a long gun application, Hall effect sensors typically do not extend down the length of the magazine. As a result, conventional Hall effect sensor-based systems for rifles and other long gun are less accurate at predicting the position of the follower because its position is often farther away from the sensors.

Another problem with many conventional round counting systems is that their performance is negatively affected by heat. Most firearms generate heat when firing a round and, because high temperatures can affect conductor resistance in Hall effect systems, the sensitivity of Hall effect-based round counting systems perform less accurately in the field during use.

Yet another problem with many conventional round counting systems is that systems that rely on analog magnetic sensors, such as Hall effect sensors, which are prone to electronic noise interference. These factors lead to a system that suffers from high signal to noise ratios and, thus, inaccurate round counting data.

Accordingly, a need exists for a robust, simple to use, accurate, and reliable round counting system for use in the field that also uses a minimum amount of components inside of the magazine to reduce complexity and keep cost low.

BRIEF SUMMARY

According to one embodiment of the present invention, a system for providing an indication of a number of rounds of ammunition in a firearm magazine is disclosed. The system includes a follower for the rounds to rest upon. The follower is internal to the magazine and configured to push the follower and the rounds toward a mouth of the magazine to facilitate feeding the rounds into the firearm. A resistive strip membrane potentiometer sensor is arranged substantially along a length of the magazine and is configured to generate an output voltage when a first and a second circuit are connected by applying pressure to a surface of the sensor. The output voltage varies based on a position where the pressure is applied to the surface of the sensor and the first and second circuits are connected. A power source, such as a battery or AC/DC adapter, applies power to the system which contains a constant current source to generate and provide an input voltage to the resistive strip membrane potentiometer sensor. A wiper is configured to apply pressure to the surface of the sensor and to connect the first and second circuits. The wiper is a non-conductive mechanism attached to the follower and configured to move along the length of the magazine corresponding to the resistive strip membrane potentiometer sensor. A round counter is configured to convert the output voltage generated by the resistive strip membrane potentiometer sensor into an indication of the number of rounds of ammunition in the firearm magazine ("round count data").

According to another embodiment of the present invention, a method for providing an indication of a number of rounds of ammunition in a firearm magazine is disclosed. The method includes providing a follower for the rounds to rest upon, where the follower is internal to the magazine and pushes the follower and the rounds toward a mouth of the magazine to facilitate feeding the rounds into the firearm. A resistive strip membrane potentiometer sensor arranged substantially along a length of the magazine generates an output voltage when pressure is applied to a surface of the sensor and a first and a second circuit are connected. The output voltage varies based on a position where the pressure is applied to the surface of the sensor and the first and second circuits are connected. A power source, such as a battery or AC/DC adapter, applies power to the system which contains a constant current source to generate and provide an input voltage to the resistive strip membrane potentiometer sensor. Pressure is applied by a wiper to the surface of the sensor and thereby connecting the first and second circuits. The wiper includes a non-conductive mechanism attached to the follower that moves along the length of the magazine corresponding to the resistive strip membrane potentiometer sensor. A round counter converts the output voltage generated by the resistive strip membrane potentiometer sensor into an indication of the number of rounds of ammunition in the firearm magazine ("round count data"). According to another embodiment of the present invention, a computer program product for providing an indication of a number of rounds of ammunition in a firearm magazine is disclosed. The computer program product includes a non-transitory computer readable storage medium having non-transitory computer readable program code embodied therewith, the computer readable program code comprising computer readable program code configured to receive, from a resistive strip membrane potentiometer sensor, an output voltage and convert the output voltage into an indication of the number of rounds of ammunition in the firearm magazine ("round count data"). The resistive strip membrane potentiometer sensor is arranged substantially along a length of the magazine. Applying pressure to a surface of the sensor connects a first and a second circuit of the resistive strip membrane potentiometer sensor. The output voltage varies based on a position where the pressure is applied to the surface of the sensor and the first and second circuits are connected. The follower is internal to the magazine and the rounds rest upon the follower such that the follower and the rounds are pushed toward a mouth of the magazine to facilitate feeding the rounds into the firearm. The wiper is a non-conductive mechanism attached to the follower and is configured to move along the length of the magazine corresponding to the resistive strip membrane potentiometer sensor.

DETAILED DESCRIPTION

The subject matter described herein includes methods, systems, and computer program products for providing an indication of a number of rounds of ammunition in a firearm magazine. In contrast to conventional configurations which rely on Hall effect sensors, Reed switches, or capacitive strip encoders, the present disclosure uses a resistive strip membrane potentiometer sensor to provide a robust, simple to use, accurate, and reliable round counting system for use in the field that uses a minimum amount of components inside of the magazine to reduce complexity and keep cost low.

Figure 1:
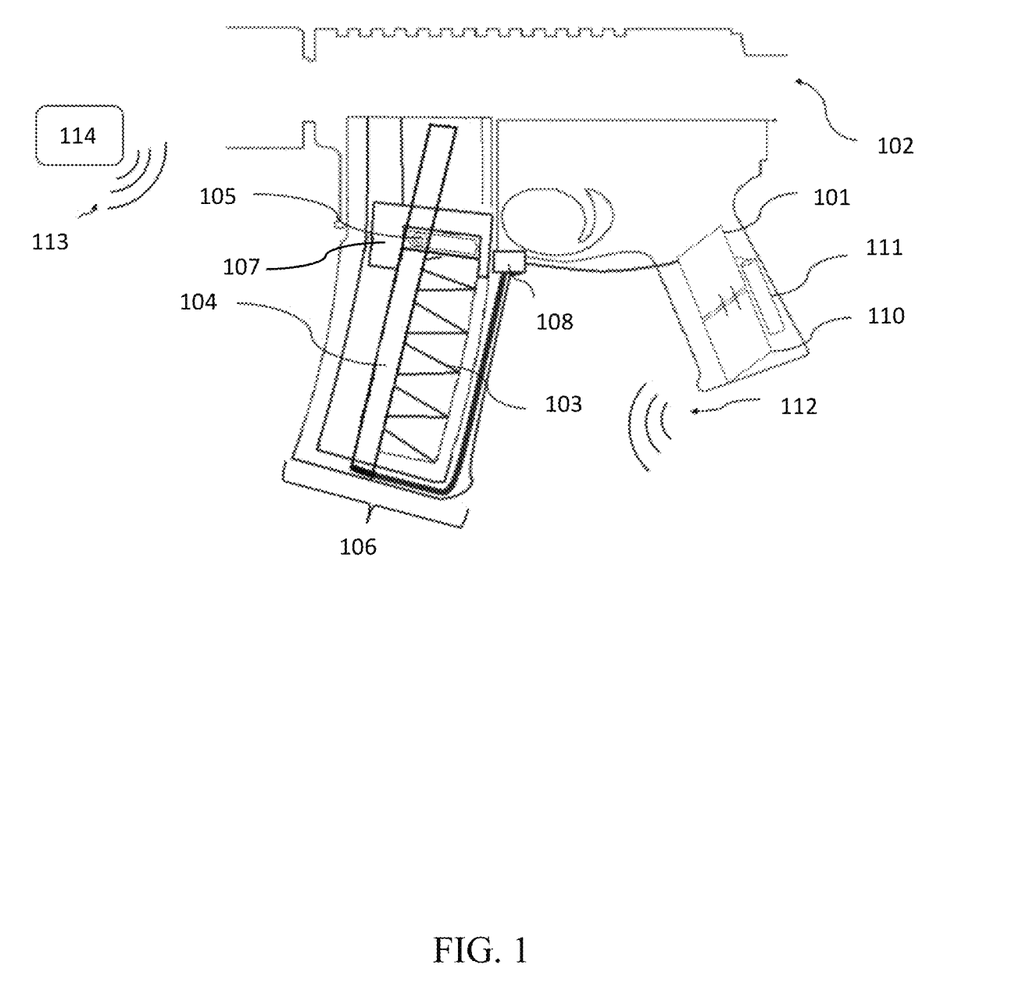
FIG. 1 is a schematic diagram illustrating side view of a firearm receiver with a detachable magazine having a resistive strip-based round counting system according to an embodiment of the subject matter described herein.

FIG. 1 is a schematic diagram illustrating side view of a firearm receiver with a detachable magazine having a resistive strip-based round counting system according to an embodiment of the subject matter described herein. Referring to FIG. 1, a firearm 102 can include a magazine 106 containing zero or more rounds of ammunition 103 inserted therein. Here, the firearm 102 is shown in a rifle configuration, but other configurations, such as pistols, may also be used without departing from the scope of the subject matter described herein.

The magazine 106 can further include a resistive strip membrane potentiometer sensor 104, a follower 107, and a wiper system 105 attached to the follower 107 for determining round counting data (e.g., an indication of a number of rounds in the magazine 106).

The follower 107 is an internal part of the magazine 106 that the rounds (bullets, cartridges, etc.) rest upon. Beneath the follower 107 may be a spring that pushes the follower 107, and consequently also the rounds, toward the mouth of the magazine 106 to facilitate feeding rounds into the firearm 102.

In one embodiment, the resistive strip membrane potentiometer sensor 104 is located along the length of the magazine 106. The resistive strip membrane potentiometer sensor 104 can span an entire length of the magazine 106 or any portion thereof. The resistive strip 104 is a resistive element including a conductive resistor and a sealed encasement. A wiper, which will be described in greater detail below with respect to wiper 105, may be associated with the resistive strip membrane potentiometer sensor 104 for actuating the potentiometer (connecting a circuit to create a potentiometric output). The resistive strip membrane potentiometer sensor 104 may be a three-wire device having two resistive output channels and an electrical collector channel.

A membrane potentiometer, such as the resistive strip membrane potentiometer sensor 104, acts as a voltage divider. The resistive strip membrane potentiometer sensor 104 can be constructed as an open circuit that only generates an output when a circuit is made (e.g., when the wiper connects the top and bottom circuits by applying pressure to the membrane surface). The spacing between circuits in the resistive strip membrane potentiometer sensor 104 (e.g., a top and a bottom circuit) may be sealed against external environmental factors, such as moisture or dust.

The wiper 105 is a non-conductive mechanism that depresses the top circuit actuating the potentiometer from the outside of the element. The top and bottom circuits are separated by 0.15 mm (0.006 inches) of spacer adhesive build-up and contact between the circuit occurs by pressure (usually 1-3 Newtons) from the wiper on the top circuit, pushing down until the top circuit connects with the bottom circuit to create a potentiometric output.

In contrast to systems that rely on Hall effect encoding to determine round count data, the subject matter described herein uses on a resistive strip membrane potentiometer sensor (also referred to as "a resistive strip", flat or soft "membrane potentiometer", or "SoftPot") to gather information on the position of the follower.

The resistive strip membrane potentiometer sensor 104 is a linear position sensor and resistive element which comprises a conductive resistor, a sealed encasement, and utilizes a wiper assembly. By pressing a wiper down onto the top membrane of the resistive strip membrane potentiometer sensor, the desired electrical output is achieved.

The wiper 105 is a nonconductive mechanism that depresses the top circuit actuating the potentiometer from the outside of the element. Contact between the top and bottom circuits occurs by pressure from the wiper 105 on the top circuit, pushing down until the top circuit connects with the bottom circuit to create a potentiometric output. The wiper 105 can be made of any suitable non-conductive material including, but not limited to, plastic and metal. The shape of the wiper 105 can include a variety of shapes or configurations including, but not limited to, sliders, rollers, and wheels. In one embodiment, it is appreciated that the resistive strip membrane potentiometer sensor 104 can be manually (hand) actuated.

Advantages of using a resistive strip membrane potentiometer sensor to determine count data for rounds of ammunition include: greater resistance, or immunity, from stray magnetic fields, accurate electrical output, small size, and low cost.

The resistive strip membrane potentiometer sensor 104 produces a desired resistive output after the wiper 105 has contacted the top membrane. When a known constant current is applied to the resistive strip membrane potentiometer sensor 104, the output is proportional to the resistance of the resistive strip membrane potentiometer sensor 104 multiplied by the known constant current. This produces an analog voltage output that is interpreted by a processor after analog-to-digital conversion.

When the wiper 105 contacts the resistive strip membrane potentiometer sensor 104, it produces a change in resistance at the output terminals of the resistive strip membrane potentiometer sensor 104.

Processing circuitry 101 and the power supply 111 may be located in a portion of the firearm 102 separate from the magazine, such as the grip. The power supply 11 may also be referred to as a power source. The power source, such as a battery or AC/DC adapter, applies power to a system which contains a constant current source used to generate and provide an input voltage to the resistive strip membrane potentiometer sensor. For example, the processing circuitry 101, the wireless antenna 110, and the power supply 111 may be located in the grip of the firearm. Although FIG. 1 shows the processing circuitry 101, the wireless antenna 110, and the power supply 111 inside of the firearm 102 handgrip, it is appreciated that in other embodiments these components can be in other locations that still allow electrical communication to the magazine 106 without departing from the scope of the subject matter described herein.

The processing circuitry 101 may be configured to analyze the raw data received from the magazine 106 sensor and convert that data to a form that can be transmitted, by wireless transmitter 110, to the wireless receiver 113 and displayed by the remote display system 114. For example, the output terminals of the resistive strip membrane potentiometer sensor 104 may be connected to the processing circuitry 101 via a coupling system 108. The coupling system 108 allows power to be sent to the resistive strip membrane potentiometer sensor 104 and allows electronic information to be received from the resistive strip membrane potentiometer sensor 104.

The processing circuitry 101 uses the information received from the resistive strip sensor 104 to detect changes in resistance along the resistive strip sensor 104 and to determine the position of the follower 107. For example, when pressure is applied at a first location of the resistive strip membrane potentiometer sensor 104, a first voltage may be detected. When pressure is applied at a second location of the resistive strip membrane potentiometer sensor 104, a second voltage may be detected. The position where the pressure is applied may change as a result of firing a round from the magazine and the follower in the magazine moving upward to load the next round.

This information on follower 107 position is then used to obtain the round count information. For example, the first and second analog voltages produced by the resistive strip membrane potentiometer sensor 104 may be converted to digital signals. Each signal may be correlated to different positions of the follower 107 within the magazine. It is appreciated that different type of ammunition and different magazines may have different correlations with the output voltages of the resistive strip membrane potentiometer sensor 104.

It is appreciated that the subject matter disclosed herein is applicable to a variety of firearms and ammunition. This includes, but is not limited to, long guns, rifles, shotguns, handguns, revolvers, pistols, carbines, machine guns, sniper rifles, submachine guns, automatic rifles, and assault rifles. This also includes, but is not limited to, bullets, cartridges, shotgun ammunition, rifle ammunition, handgun ammunition, rimfire cartridges, centerfire cartridges, full metal jacket bullets, hollow point bullets, soft point bullets, wad cutter bullets, and semi-jacketed bullets. The round counter is configured to associate a change in the output voltage above or below a predetermined threshold value with a movement of the follower 107 corresponding to a single round of the ammunition. For example, the round counter may compare a change in the output voltage received from the resistive strip membrane potentiometer sensor 104 with a previously determined change in the output voltage corresponding to a particular type of ammunition. This association or correlation may also be determined by machine learning.

Machine learning (ML) is the use of computer algorithms that can improve automatically through experience and by the use of data. Machine learning algorithms build a model based on sample data, known as training data, to make predictions or decisions without being explicitly programmed to do so. Machine learning algorithms are used where it is unfeasible to develop conventional algorithms to perform the needed tasks.

In certain embodiments, instead of or in addition to performing the functions described herein manually, the system may perform some or all of the functions using machine learning or artificial intelligence. Thus, in certain embodiments, machine learning-enabled software relies on unsupervised and/or supervised learning processes to perform the functions described herein in place of a human user.

Machine learning may include identifying one or more data sources and extracting data from the identified data sources. Instead of or in addition to transforming the data into a rigid, structured format, in which certain metadata or other information associated with the data and/or the data sources may be lost, incorrect transformations may be made, or the like, machine learning-based software may load the data in an unstructured format and automatically determine relationships between the data. Machine learning-based software may identify relationships between data in an unstructured format, assemble the data into a structured format, evaluate the correctness of the identified relationships and assembled data, and/or provide machine learning functions to a user based on the extracted and loaded data, and/or evaluate the predictive performance of the machine learning functions (e.g., "learn" from the data).

In certain embodiments, machine learning-based software assembles data into an organized format using one or more unsupervised learning techniques. Unsupervised learning techniques can identify relationship between data elements in an unstructured format.

In certain embodiments, machine learning-based software can use the organized data derived from the unsupervised learning techniques in supervised learning methods to respond to analysis requests and to provide machine learning results, such as a classification, a confidence metric, an inferred function, a regression function, an answer, a prediction, a recognized pattern, a rule, a recommendation, or other results. Supervised machine learning, as used herein, comprises one or more modules, computer executable program code, logic hardware, and/or other entities configured to learn from or train on input data, and to apply the learning or training to provide results or analysis for subsequent data.

Machine learning-based software may include a model generator, a training data module, a model processor, a model memory, and a communication device. Machine learning-based software may be configured to create prediction models based on the training data. In some embodiments, machine learning-based software may generate decision trees. For example, machine learning-based software may generate nodes, splits, and branches in a decision tree. Machine learning-based software may also calculate coefficients and hyper parameters of a decision tree based on the training data set. In other embodiments, machine learning-based software may use Bayesian algorithms or clustering algorithms to generate predicting models. In yet other embodiments, machine learning-based software may use association rule mining, artificial neural networks, and/or deep learning algorithms to develop models. In some embodiments, to improve the efficiency of the model generation, machine learning-based software may utilize hardware optimized for machine learning functions, such as an FPGA.

The round count information may then be passed to a transmitter 110. The transmitter 110 may wirelessly send the round count information 112 to an external or remote device. For example, the transmitter 110 may send the round count information to a wireless receiver 113 associated with a display device 114. In one embodiment, the display device 114 can be located, affixed, coupled, or otherwise associated with the firearm 102. For example, a digital display may be affixed to the firearm, coupled to a scope, receiver, or any part of the firearm 102. In other embodiments the display device 114 may be located remotely from the firearm 102. For example, the display device may be associated with or incorporated into a user's goggles, glasses, mobile device (e.g., smartphone), watch or wrist device, or on the magazine 106 itself.

Figure 2:
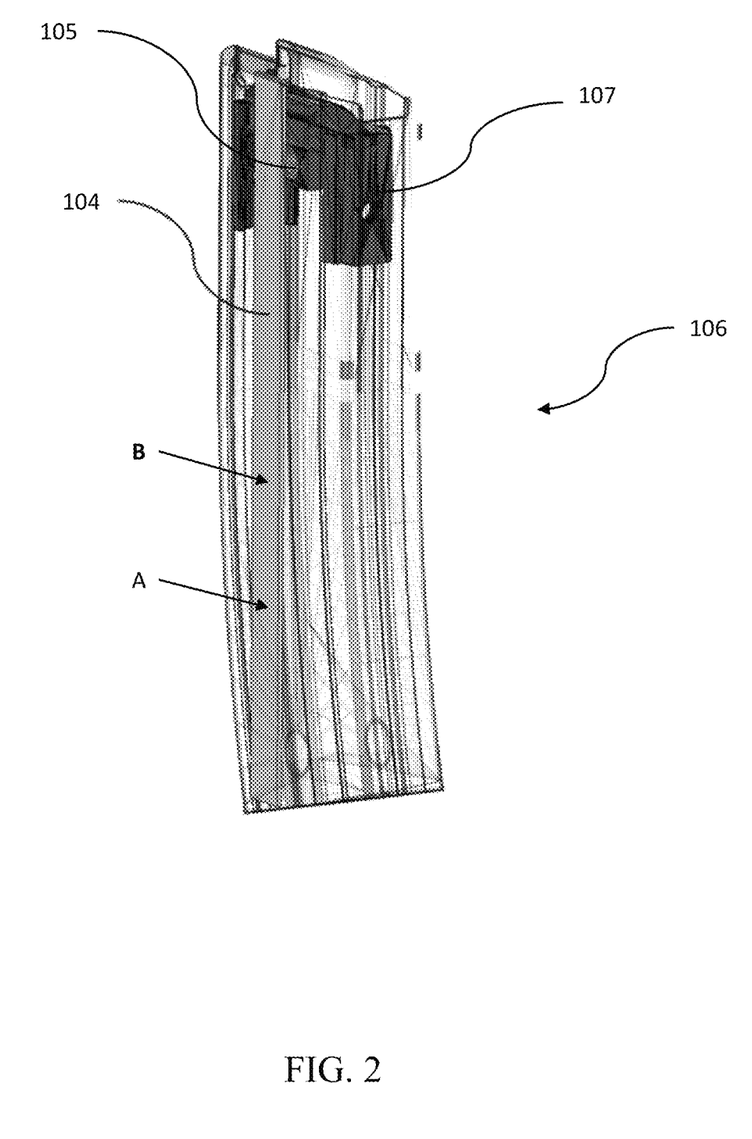
FIG. 2 is a diagram of an orthographic view of a magazine illustrating a positioning of a resistive strip membrane potentiometer sensor along the length of the magazine according to an embodiment of the subject matter described herein.

FIG. 2 is a diagram of an orthographic view of a magazine illustrating a positioning of a resistive strip membrane potentiometer sensor along the length of the magazine according to an embodiment of the subject matter described herein. It is appreciated that while the magazine shown is related to an AR-15 style firearm, the subject matter described herein is not limited to AR-15 style rifles and is applicable to any firearm with a detachable magazine. Referring to FIG. 2, the follower 107 is internal to the magazine 106. One or more rounds of ammunition rest on the follower 107 and the follower 107 is configured to push the follower 107 and the rounds toward a mouth of the magazine 106 to facilitate feeding the rounds into the firearm. For example, a spring may provide an upward biasing force on the follower 107.

The resistive strip membrane potentiometer sensor 104 is arranged substantially along a length (e.g., side) of the magazine 106 and is configured to generate an output voltage when a first and a second circuit are connected by applying pressure to a surface of the sensor 104. The output voltage varies based on a position where the pressure is applied to the surface of the sensor and the first and second circuits are connected. For example, pressure applied at location A (lower down the magazine) may be associated with a first voltage while pressure applied at location B (higher up the magazine) may be associated with a second voltage, where the first and second voltages are different. As will be discussed below, the first voltage may indicate that the follower is lower down in the magazine and, therefore, that the magazine contains more rounds than indicated by the second voltage.

A power source (not shown), such as a battery or AC/DC adapter, applies power to a system which contains a constant current source used to generate and provide an input voltage to the resistive strip membrane potentiometer sensor 104. A wiper 105 is attached or otherwise associated with the follower 107 and configured to apply pressure to the surface of the sensor 104 to connect the first and second circuits. The wiper 105 is a non-conductive mechanism attached to the follower 107 and configured to move along the length of the magazine corresponding to the resistive strip membrane potentiometer sensor 104. A round counter (not shown) converts the output voltage generated by the resistive strip membrane potentiometer sensor 104 into an indication of the number of rounds of ammunition in the firearm magazine ("round count data").

Figure 3:
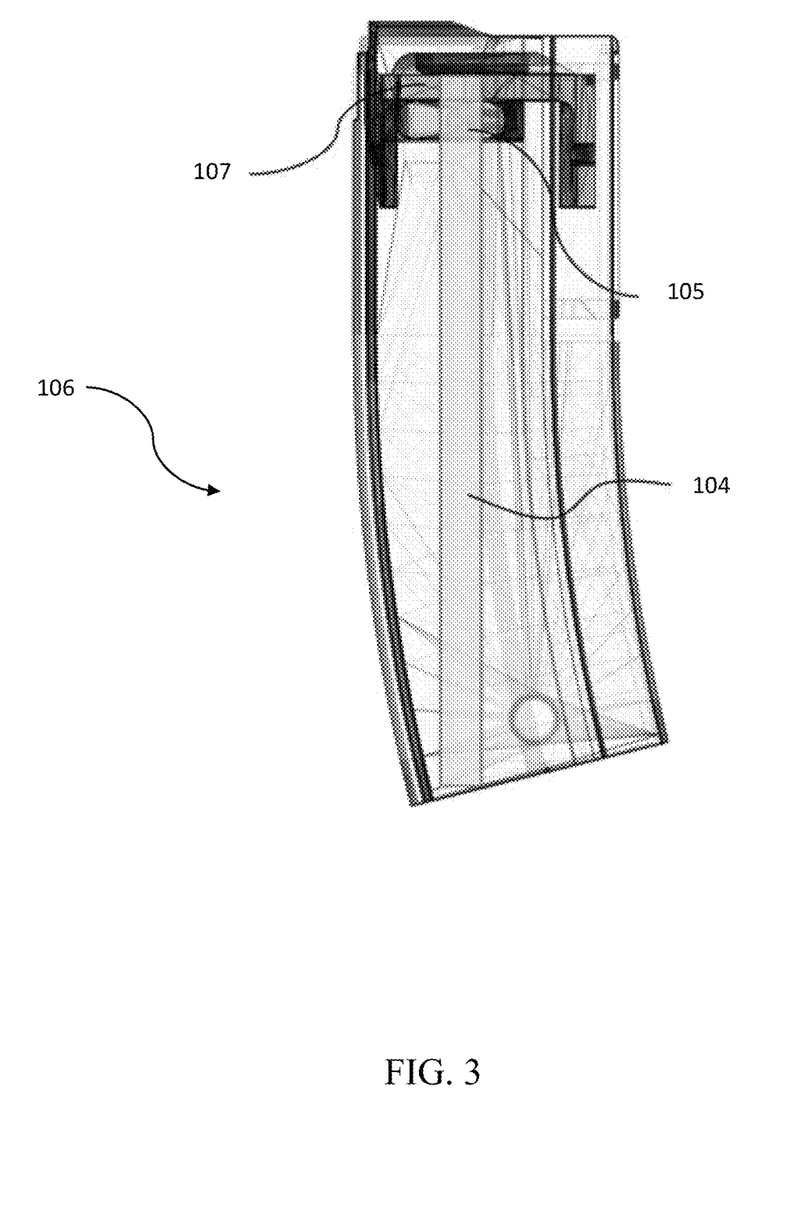
FIG. 3 is a profile view of a magazine having a follower, a wiper, and a channel for a resistive strip membrane potentiometer sensor along the length of the magazine according to an embodiment of the subject matter described herein.

FIG. 3 is a profile view of a magazine having a follower, a wiper, and a channel for a resistive strip membrane potentiometer sensor along the length of the magazine according to an embodiment of the subject matter described herein. FIG. 3 is the same configuration as shown in FIG. 2. Referring to the side profile view of a magazine 106, this embodiment shows the resistive strip membrane potentiometer sensor 104 and the wiper 105 built into the follower 107. FIG. 3 illustrates the relationship between the wiper 105 and the resistive strip membrane potentiometer sensor 104. As the wiper 105 applies pressure to different points on the resistive strip membrane potentiometer sensor 104, the resistance changes at the output terminals of the resistive strip membrane potentiometer sensor 104.

Figure 4:
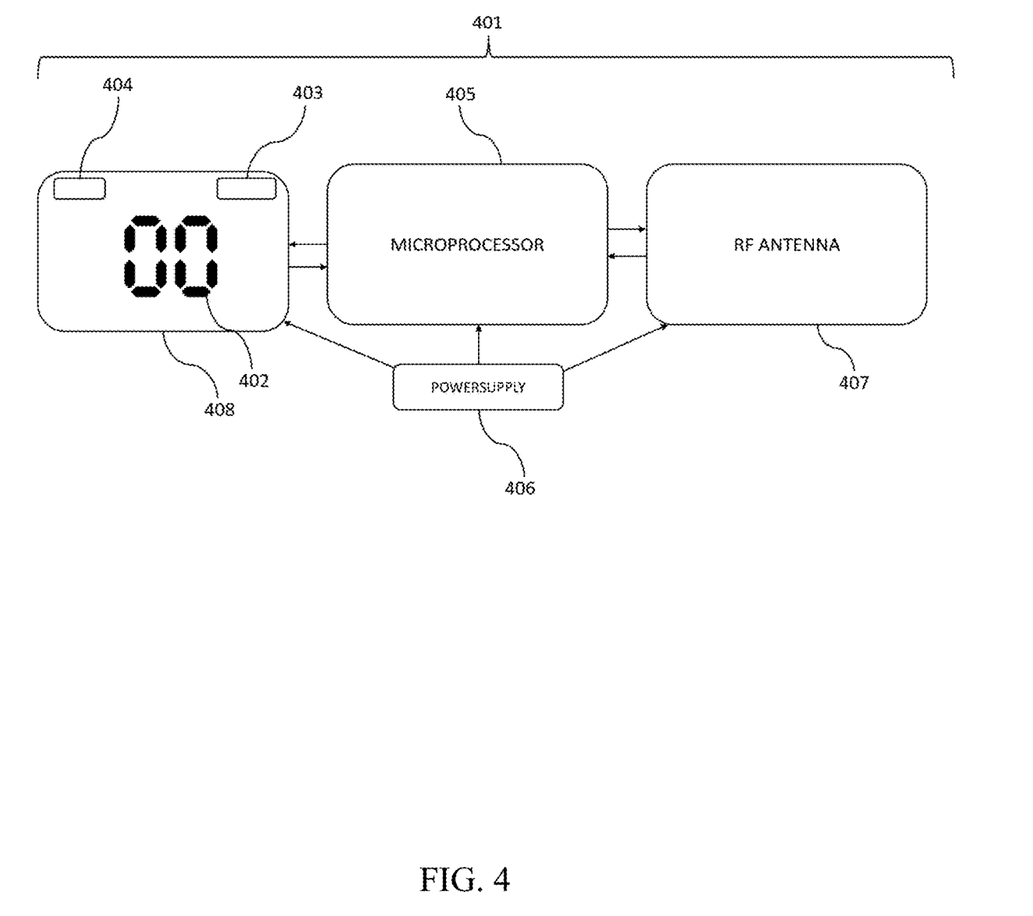
FIG. 4 is a functional block diagram of a system for receiving and displaying a round count from a firearm receiver with a detachable magazine having a resistive strip-based round counting system according to an embodiment of the subject matter described herein.

FIG. 4 is a functional block diagram of a system for receiving and displaying a round count from a firearm receiver with a detachable magazine having a resistive strip-based round counting system according to an embodiment of the subject matter described herein. After a transmission is received via the radio frequency (RF) antenna 407, the round count data is processed and analyzed by the microprocessor 405. Once the round count data is determined, the round count data is sent to the digital display 408 and the round count 402 is displayed to the user. The display is not limited to displaying the round count in area 402 of the display 408. The display can also be used to display other system information, such as battery life, connection strength, and system temperature. For example, this additional information may be displayed in in areas 403 and/or 404 of the display 408 so that the round count data can always be displayed in area 402.

Figure 5:
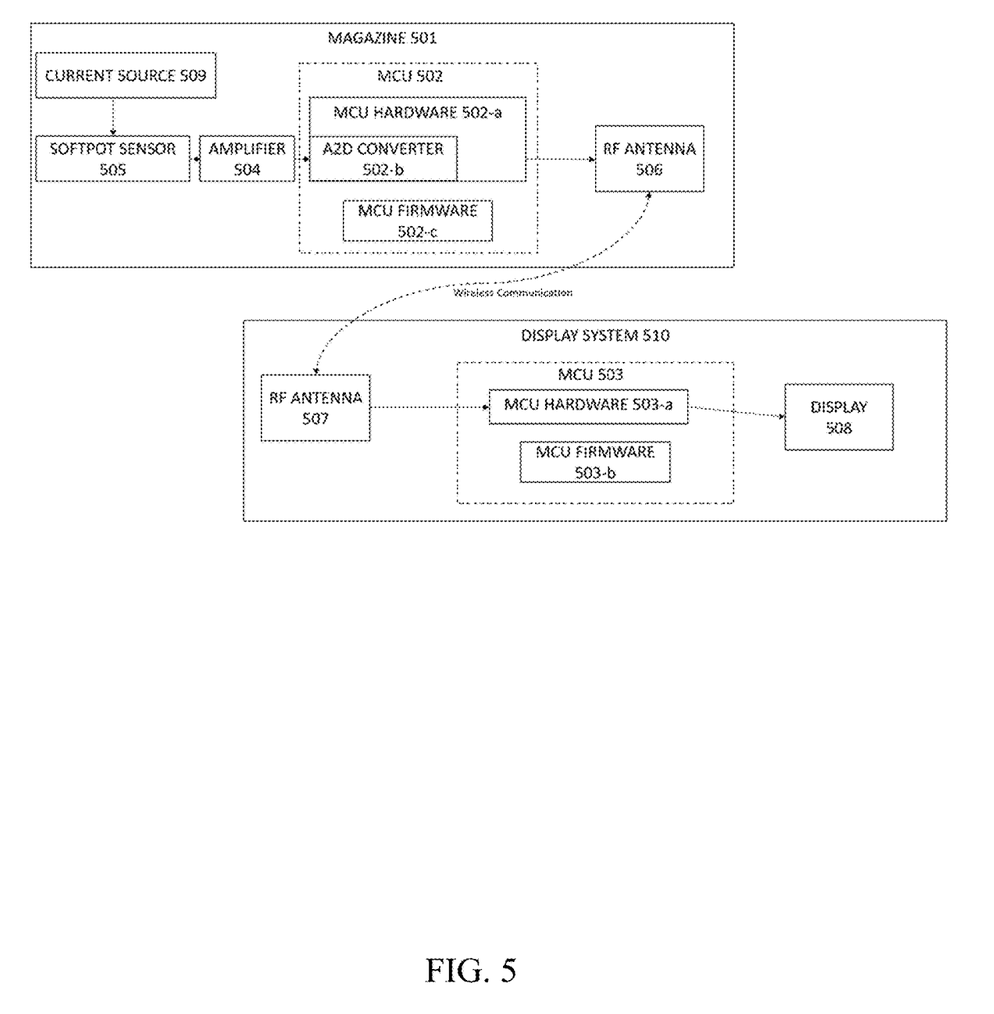
FIG. 5 is a functional block diagram of a system for receiving and displaying a round count from a firearm receiver with a detachable magazine having a resistive strip-based round counting system according to an embodiment of the subject matter described herein.

FIG. 5 is a functional block diagram of a system for receiving and displaying a round count from a firearm receiver with a detachable magazine having a resistive strip-based round counting system according to an embodiment of the subject matter described herein. Referring to FIG. 5, the system 500 includes a magazine 501 and a display system 510.

The magazine 501 can include a follower having a wiper, where the wiper travels along a straight or curved path as the number of rounds/cartridges in the magazine changes. A small current produced by current source 509 induces an electric potential in the resistive strip membrane potentiometer sensor 505. The resistive strip membrane potentiometer sensor 505 can be arranged along the path of the wipers travel, such that the resistance in the resistive strip membrane potentiometer sensor 505 changes, and as the resistance changes in the resistive strip membrane potentiometer sensor 505, the electric potential of the resistive strip membrane potentiometer sensor 505 changes. This electric potential is amplified with amplifier 504 and communicated to the A2D converter 502-b on microcontroller unit (MCU) 502. A typical microcontroller includes a processor, memory and input/output peripherals (I/O) on a chip. The MCU 502 then ascertains the number of rounds remaining in the magazine 501 based on the position of the follower and passes it to a RF antenna 506. Once the RF antenna has received the data from MCU 502, it wirelessly broadcasts the round data to RF antenna 507 on the display system 510.

The display system 510 can further include a microcontroller unit (MCU) 503 having MCU hardware 503-a and MCU firmware 503-b for performing functions described herein. The MCU 503 may be connected or communicatively coupled to a display 508. When the RF antenna 507 receives the round count data from the RF antenna 506, the round count data may be forwarded, or otherwise received, by the MCU 503 for processing. This processing may include, for example, decoding and/or storing the round count data.

For example, the MCU 503 may receive round count data indicating that four rounds were fired from the magazine. The MCU 503 may determine that the magazine holds a maximum of ten rounds and that the magazine was fully loaded initially. Thus, the MCU 503 may determine that there are six rounds remaining in the magazine. The current number of rounds remaining in the magazine and/or the number of rounds fired may constitute round count data and may be displayed on the display 508. In another embodiment, these determinations may be performed by MCU 502 instead of MCU 503. In such an embodiment, the MCU 503 may receive the current number of rounds remaining in the magazine and/or the number of rounds fired directly from the MCU 502 and simply relay this information to the display 508.

In another embodiment, the MCU 503 and/or the MCU 502 may determine a total number of rounds used over a period of time. This may constitute determining a history of usage. For example, a time and/or date stamp may be associated with the round count data.

In other embodiments, a type of ammunition, magazine size, or other data may be associated with the round count data. For example, the MCU 503 and/or the MCU 502 may determine that a first type of ammunition was used ten times over a period of one hour and a second type of ammunition was used twenty times over a period of half an hour.

Figure 6:
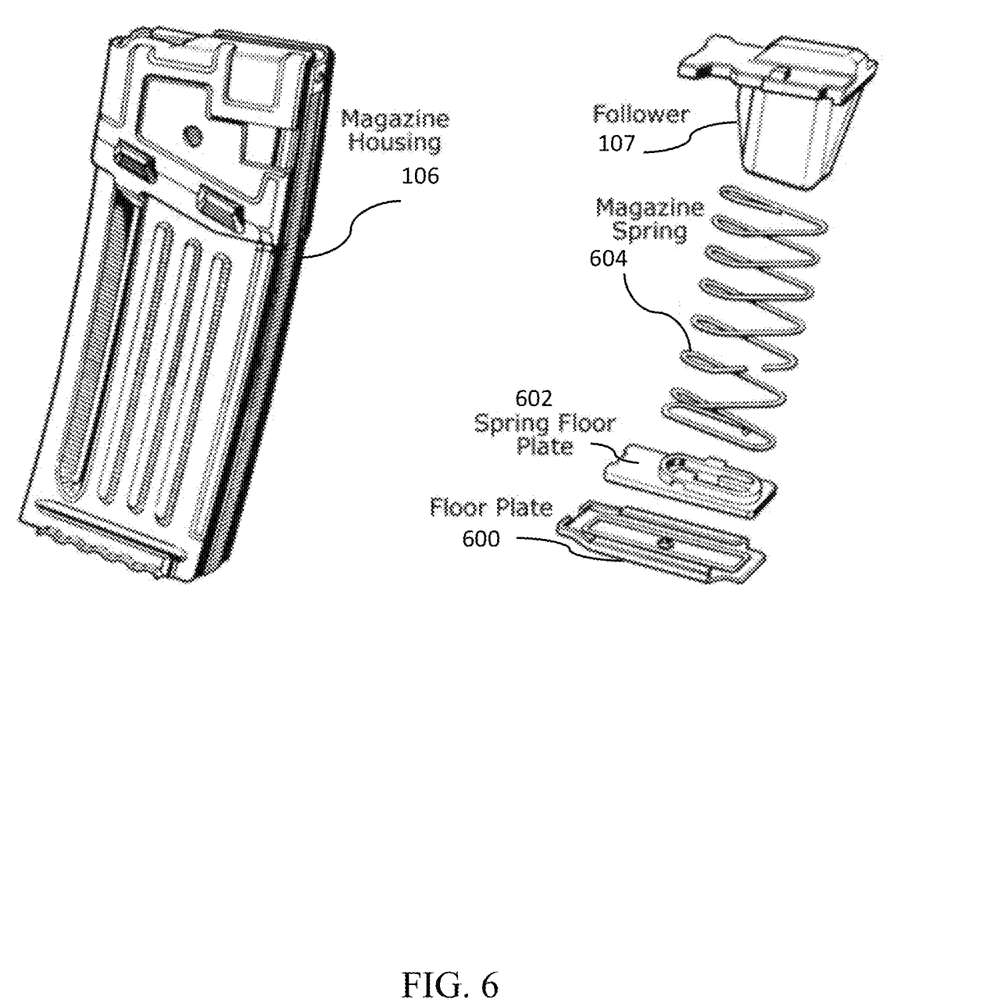
FIG. 6 is a perspective view diagram of a magazine housing and internal components of the magazine housing including a follower for suitable for use with a resistive strip-based round counting system according to an embodiment of the subject matter described herein.

FIG. 6 is a perspective view diagram of a magazine housing and internal components of the magazine housing including a follower for suitable for use with a resistive strip-based round counting system according to an embodiment of the subject matter described herein. Referring to FIG. 6, inside of the magazine housing 106 may be a floor plate 600, onto which a spring floor plate 602 is coupled. The spring floor plate secures a magazine spring 604 for providing a compression force between the floor plate 600 and the follower 107. The magazine spring 604 pushes the follower 107 upward through the magazine housing 106 as round are fired (or removed) from the magazine. As disclosed herein, by attaching a resistive strip membrane potentiometer sensor along a length of the magazine housing 106 and attaching a corresponding wiper 105 to the follower 107, a position of the follower 107 can be determined and, as a result, an indication of the number of rounds remaining in the magazine 106 can be determined.

Figure 7:
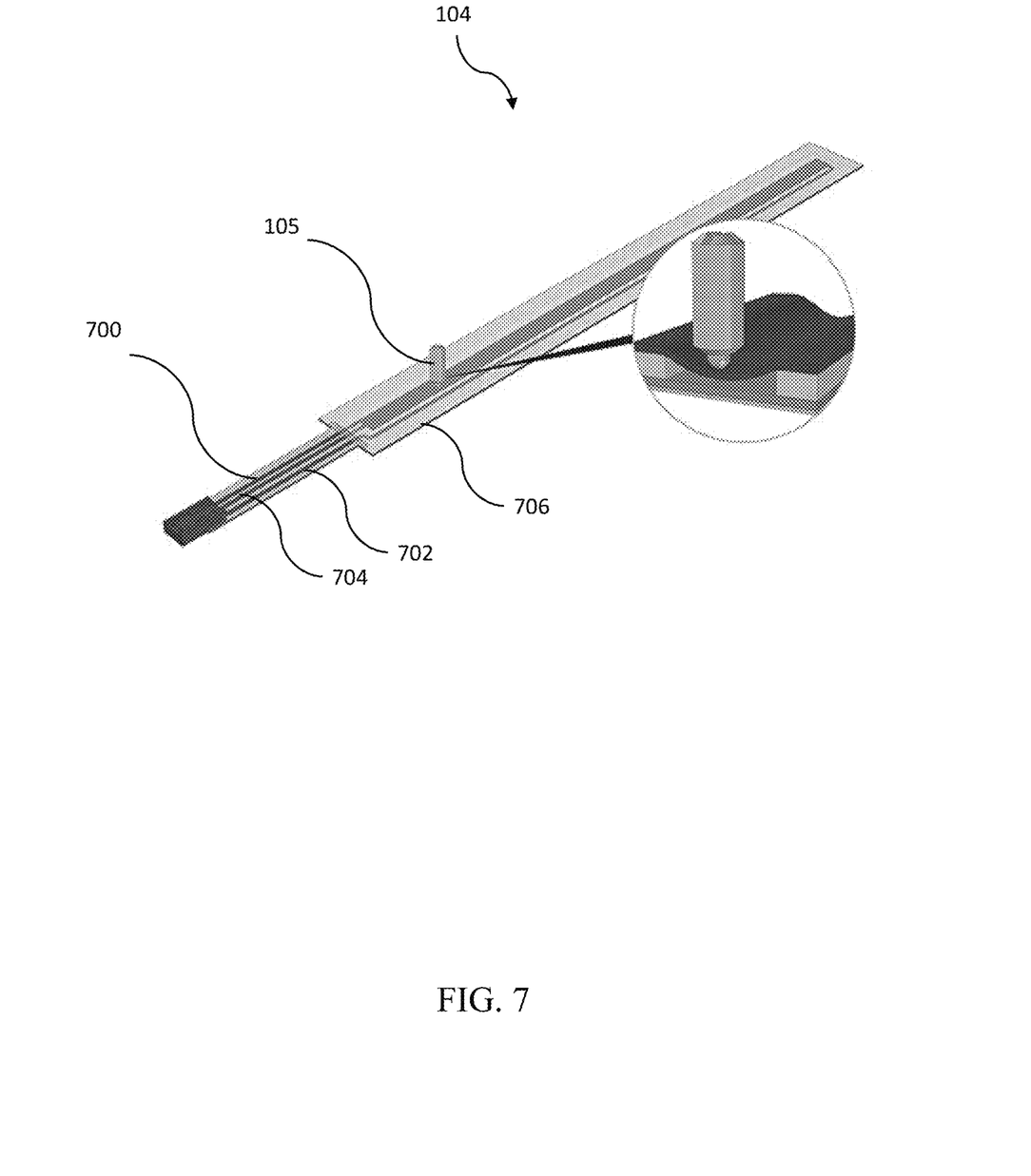
FIG. 7 is a perspective view schematic diagram of a resistive strip membrane potentiometer sensor suitable for positioning along a length of a magazine for round counting according to an embodiment of the subject matter described herein.

FIG. 7 is a perspective view diagram of a resistive strip membrane potentiometer sensor suitable for positioning along a length of a magazine for round counting according to an embodiment of the subject matter described herein. Like any potentiometer, the resistive strip membrane potentiometer sensor 104 is a three-terminal device. The middle pin may be associated with the wiper and the other two terminals may be associated with the high and low ends of the resistive element. By supplying the outer terminals with a power and ground connection, the middle terminal can be used to produce a variable voltage. Instead of a knob or physical slider, the wiper for the resistive strip membrane potentiometer sensor 104 can include any object that slides across its sensor membrane. The resistive strip membrane potentiometer sensor 104 can be used as a position sensor for linear movement sensing. Thus, the resistive strip membrane potentiometer sensor 104 can determine the linear movement, or location, of the follower 107 relative to the resistive strip membrane potentiometer sensor 104 which is attached along the length of the magazine 106.

As discussed above, the position of the follower 107 can indicate a number of rounds left in the magazine 106. This indication, however, indirectly detects the presence of location of each round of ammunition individually because it is assumed that the magazine 106 moves up as rounds are removed from the magazine (e.g., fired). The location of rounds with the magazine 106 are also assumed to be contiguous (i.e., rounds are located next to one another and not interspersed by empty space within the magazine). The follower 107, therefore, divides an upper portion of the magazine 106 that includes the remaining unfired rounds and a lower portion of the magazine 106 that is empty of ammunition.

It is appreciated that calibration may be required to associate various positions of the follower 107 with round count data. For example, a first type of ammunition may have a first diameter such that a maximum of ten rounds may be present in the magazine 106. A second type of ammunition may have a second diameter such that a maximum of six rounds may be present in the same magazine 106. Therefore, depending on the type (i.e., size) of rounds in the magazine 106, the follower 107 may move a different distance after firing. Correspondingly, the electrical indication produced by the resistive strip membrane potentiometer sensor 104 may be different for different sizes of ammunition. In one embodiment, the system can be pre-programmed for different types of ammunitions. Using the system may include the user providing an indication of the type of ammunition used for more accurate counting. In another embodiment, the system may be configured to automatically determine a type of ammunition used. For example, the system may automatically calibrate itself after firing at least one round by comparing information received from the resistive strip membrane potentiometer sensor 104 with past data. The past data received from one or more resistive strip membrane potentiometer sensors 104 may be stored locally or at a remote database.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for providing an indication of a number of rounds of ammunition in a magazine of a firearm, the system comprising:
    a follower for the rounds to rest upon, wherein the follower is internal to the magazine and configured to push the rounds toward a mouth of the magazine to facilitate feeding the rounds into the firearm;
    a resistive strip membrane potentiometer sensor arranged substantially along a length of the magazine and configured to generate an output voltage when a first and a second circuit are connected by applying pressure to a surface of the sensor, wherein the output voltage varies based on a position where the pressure is applied to the surface of the sensor and the first and second circuits are connected;
    a power source configured to apply power to the system to generate and provide an input voltage to the resistive strip membrane potentiometer sensor;
    a wiper configured to apply pressure to the surface of the sensor and to connect the first and second circuits, wherein the wiper is an electrically non-conductive mechanism attached to the follower and configured to move along the length of the magazine corresponding to the resistive strip membrane potentiometer sensor; and
    a round counter configured to convert the output voltage generated by the resistive strip membrane potentiometer sensor into an indication of the number of rounds of ammunition in the firearm magazine ("round count data"),
        wherein the conversion of the output voltage to the indication of the number of rounds of ammunition is performed in software and is adaptable to accommodate a plurality of calibers of ammunition based on a calibration process that includes a diameter of the caliber of ammunition in the magazine.

2. The system of claim 1, further comprising a display device configured to display the round count data.

3. The system of claim 2, wherein the display device is attached to the firearm.

4. The system of claim 3, wherein the display device includes one of: a digital display affixed to the firearm, a scope affixed to the firearm, or a receiver of the firearm.

5. The system of claim 2, wherein the display device is separate from the firearm.

6. The system of claim 5, wherein the display device includes one of: goggles, glasses, a mobile device, or the magazine.

7. The system of claim 2, wherein the display device is further configured to display at least one of: power source information, wireless communication information, and temperature information.

8. The system of claim 1, further comprising a coupling system configured to electrically connect the resistive strip membrane potentiometer sensor and the round counter and the power source.

9. The system of claim 8, wherein the coupling system includes one or more conductive wires for providing power to the resistive strip membrane potentiometer sensor and for receiving the output voltage from the resistive strip membrane potentiometer sensor.

10. The system of claim 1, wherein the round counter includes an amplifier for amplifying the output voltage and an analog-to-digital converter for converting the output voltage into a digital signal.

11. The system of claim 1, wherein the power source includes a battery.

12. The system of claim 1, wherein the round counter is further configured to store the round count data.

13. The system of claim 1, further comprising a communications module configured to transmit the round count data to a remote device.

14. The system of claim 13, wherein communications module includes a radio frequency (RF) antenna for wirelessly transmitting the round count data.

15. The system of claim 1, wherein the firearm includes at least one of: long guns, rifles, shotguns, handguns, revolvers, pistols, carbines, machine guns, sniper rifles, submachine guns, automatic rifles, and assault rifles.

16. The system of claim 1, wherein the ammunition includes at least one of: bullets, cartridges, shotgun ammunition, rifle ammunition, handgun ammunition, rimfire cartridges, centerfire cartridges, full metal jacket bullets, hollow point bullets, soft point bullets, wad cutter bullets, and semi-jacketed bullets.

17. The system of claim 1, wherein the round counter is configured to associate a change in the output voltage above or below a predetermined threshold value with a movement of the follower corresponding to a single round of the ammunition.

18. The system of claim 1, wherein the round counter is configured to compare a change in the output voltage received from the resistive strip membrane potentiometer sensor with a previously determined change in the output voltage corresponding to a type of ammunition.

19. A method for providing an indication of a number of rounds of ammunition in a firearm magazine, the method comprising:
    providing a follower for the rounds to rest upon, wherein the follower is internal to the magazine and pushes the rounds toward a mouth of the magazine to facilitate feeding the rounds into the firearm;
    generating, by a resistive strip membrane potentiometer sensor arranged substantially along a length of the magazine, an output voltage when pressure is applied to a surface of the sensor and a first and a second circuit are connected, wherein the output voltage varies based on a position where the pressure is applied to the surface of the sensor and the first and second circuits are connected;

applying power, by a power source, to the system to generate and provide an input voltage to the resistive strip membrane potentiometer sensor;

applying pressure, by a wiper, to the surface of the sensor and connecting the first and second circuits, wherein the wiper includes an electrically non-conductive mechanism attached to the follower and is configured to move along the length of the magazine corresponding to the resistive strip membrane potentiometer sensor; and converting, by a round counter, the output voltage generated by the resistive strip membrane potentiometer sensor into an indication of the number of rounds of ammunition in the firearm magazine ("round count data"), wherein the conversion of the output voltage to the indication of the number of rounds of ammunition is performed in software and is adaptable to accommodate a plurality of calibers of ammunition based on a calibration process that includes a diameter of the caliber of ammunition in the magazine.

20. A computer program product for providing an indication of a number of rounds of ammunition in a firearm magazine, said computer program product comprising:

a non-transitory computer readable storage medium having non-transitory computer readable program code embodied therewith, the computer readable program code comprising computer readable program code configured to:

receive, from a resistive strip membrane potentiometer sensor, an output voltage; and convert the output voltage into an indication of the number of rounds of ammunition in the firearm magazine ("round count data"), wherein the resistive strip membrane potentiometer sensor is arranged substantially along a length of the magazine, wherein pressure is applied, by a wiper configured to move along the length of the magazine corresponding to the resistive strip membrane potentiometer sensor, to a surface of the sensor for connecting a first and a second circuit of the resistive strip membrane potentiometer sensor, wherein the output voltage varies based on a position where the pressure is applied to the surface of the sensor and the first and second circuits are connected, wherein the wiper includes an electrically non-conductive mechanism attached to a follower, and wherein the follower is internal to the magazine and the rounds of ammunition rest upon the follower, wherein the conversion of the output voltage to the indication of the number of rounds of ammunition is adaptable to accommodate a plurality of calibers of ammunition based on a calibration process that includes a diameter of the caliber of ammunition in the magazine.

* * * * *